United States Patent
Wolmuth

(10) Patent No.: US 8,175,231 B2
(45) Date of Patent: *May 8, 2012

(54) TOLL-FREE DIRECTORY ASSISTANCE WITH AUTOMATIC SELECTION OF AN ADVERTISEMENT FROM A CATEGORY

(75) Inventor: Scott Wolmuth, Santa Rosa, CA (US)

(73) Assignee: Jingle Networks, Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/728,189

(22) Filed: Mar. 23, 2007

(65) Prior Publication Data

US 2007/0274476 A1      Nov. 29, 2007

Related U.S. Application Data

(63) Continuation of application No. 10/063,990, filed on May 31, 2002, now Pat. No. 7,212,615.

(51) Int. Cl.
*H04M 1/64* (2006.01)

(52) U.S. Cl. ............. 379/88.22; 379/93.12; 379/114.05; 379/114.1; 379/114.11; 379/114.12; 379/114.13

(58) Field of Classification Search ............... 379/88.22, 379/93.12, 114.05, 114.1, 114.11, 114.12, 379/114.13
See application file for complete search history.

(56) References Cited

U.S. PATENT DOCUMENTS

| | | |
|---|---|---|
| 4,193,113 A | 3/1980 | Cykowski |
| 4,839,919 A | 6/1989 | Borges |
| 4,850,007 A | 7/1989 | Marino et al. |
| 4,943,995 A | 7/1990 | Daudelin |
| 5,187,735 A | 2/1993 | Herrero Garcia et al. |
| 5,222,120 A | 6/1993 | McLeod et al. |
| 5,321,740 A | 6/1994 | Gregorek et al. |
| 5,339,352 A | 8/1994 | Armstrong et al. |
| 5,361,295 A | 11/1994 | Solomon et al. |
| 5,444,713 A | 8/1995 | Backaus et al. |
| 5,448,625 A | 9/1995 | Lederman |
| 5,452,351 A | 9/1995 | Yamamoto |
| 5,479,491 A | 12/1995 | Herrero Garcia et al. |

(Continued)

FOREIGN PATENT DOCUMENTS

EP    0 946 061 A2    9/1999

(Continued)

OTHER PUBLICATIONS

Declaration of Scott Wolmuth with attached Exhibit A entitled "Project Description Business Plan for Start Up Funding," posted to Elance.com (May 30, 2001).

(Continued)

*Primary Examiner* — Quynh Nguyen
(74) *Attorney, Agent, or Firm* — DLA Piper LLP US

(57) ABSTRACT

The current invention is a system for providing telephone directory assistance service in which a telephone user calls to the system and the system will, based on the requested number or type of service, hear a recorded advertisement. The advertisements are selected from a databank, which may include any number advertisements categorized within the category associated with the service, according to selection criteria. After the advertising announcement is completed, the directory assistance call is processed as usual. The selection criteria can include the use of SIC codes.

75 Claims, 6 Drawing Sheets

U.S. PATENT DOCUMENTS

| | | | |
|---|---|---|---|
| 5,539,809 A | 7/1996 | Mayer et al. | |
| 5,557,658 A | 9/1996 | Gregorek et al. | |
| 5,613,006 A * | 3/1997 | Reese | 379/67.1 |
| 5,652,784 A | 7/1997 | Blen et al. | |
| 5,689,547 A | 11/1997 | Mölne | |
| 5,724,521 A | 3/1998 | Dedrick | |
| 5,764,731 A | 6/1998 | Yablon | |
| 5,794,210 A | 8/1998 | Goldhaber et al. | |
| 5,838,314 A | 11/1998 | Neel | |
| 5,850,433 A | 12/1998 | Rondeau | |
| 5,852,775 A | 12/1998 | Hidary | |
| 5,873,032 A | 2/1999 | Cox et al. | |
| 5,909,670 A | 6/1999 | Trader et al. | |
| 5,926,754 A | 7/1999 | Cirelli et al. | |
| 5,937,037 A | 8/1999 | Kamel et al. | |
| 6,009,150 A | 12/1999 | Kamel | |
| 6,078,866 A | 6/2000 | Buck et al. | |
| 6,118,862 A | 9/2000 | Dorfman et al. | |
| 6,178,231 B1 | 1/2001 | Nabkel | |
| 6,212,262 B1 | 4/2001 | Kamel | |
| 6,269,336 B1 | 7/2001 | Ladd et al. | |
| 6,269,337 B1 | 7/2001 | Desmond et al. | |
| 6,269,361 B1 | 7/2001 | Davis et al. | |
| 6,301,342 B1 | 10/2001 | Ander et al. | |
| 6,385,308 B1 | 5/2002 | Cohen et al. | |
| 6,385,592 B1 | 5/2002 | Angles | |
| 6,404,877 B1 | 6/2002 | Bolduc et al. | |
| 6,434,398 B1 | 8/2002 | Inselberg | |
| 6,473,612 B1 | 10/2002 | Cox et al. | |
| 6,493,437 B1 | 12/2002 | Olshansky | |
| 6,526,135 B1 | 2/2003 | Paxson | |
| 6,553,113 B1 | 4/2003 | Dhir et al. | |
| 6,570,974 B1 | 5/2003 | Gerszberg | |
| 6,577,714 B1 | 6/2003 | Darcie et al. | |
| 6,601,041 B1 | 7/2003 | Brown et al. | |
| 6,603,844 B1 | 8/2003 | Chavez, Jr. et al. | |
| 6,614,896 B1 | 9/2003 | Rao | |
| 6,618,474 B1 | 9/2003 | Reese | |
| 6,628,772 B1 | 9/2003 | McGrath et al. | |
| 6,647,257 B2 | 11/2003 | Owensby | |
| 6,658,093 B1 | 12/2003 | Langseth et al. | |
| 6,658,389 B1 | 12/2003 | Alpdemir | |
| 6,718,551 B1 | 4/2004 | Swix et al. | |
| 6,731,625 B1 | 5/2004 | Eastep et al. | |
| 6,775,371 B2 | 8/2004 | Elsey et al. | |
| 6,826,559 B1 | 11/2004 | Ponte | |
| 6,856,673 B1 | 2/2005 | Banks | |
| 6,937,708 B2 | 8/2005 | Hirose | |
| 6,947,531 B1 | 9/2005 | Lewis et al. | |
| 6,956,933 B2 | 10/2005 | Virag et al. | |
| 6,970,548 B2 | 11/2005 | Pines et al. | |
| 6,985,569 B2 | 1/2006 | Baker | |
| 6,996,413 B2 | 2/2006 | Inselberg | |
| 6,996,531 B2 | 2/2006 | Korall et al. | |
| 7,023,969 B2 | 4/2006 | Pines et al. | |
| 7,047,242 B1 | 5/2006 | Ponte | |
| 7,113,571 B2 * | 9/2006 | Matsubara et al. | 379/72 |
| 7,158,621 B2 | 1/2007 | Bayne | |
| 7,206,391 B2 | 4/2007 | Chiu | |
| 7,212,615 B2 | 5/2007 | Wolmuth | |
| 7,400,711 B1 * | 7/2008 | Ford et al. | 379/70 |
| 7,596,218 B2 | 9/2009 | Montemer | |
| 7,702,084 B2 | 4/2010 | Wolmuth | |
| 7,865,457 B2 | 1/2011 | Ravin | |
| 2001/0022788 A1 | 9/2001 | Matsubara | |
| 2001/0049677 A1 | 12/2001 | Talib | |
| 2003/0032409 A1 | 2/2003 | Hutcheson et al. | |
| 2003/0078928 A1 | 4/2003 | Dorosario | |
| 2003/0125958 A1 * | 7/2003 | Alpdemir et al. | 704/275 |
| 2003/0223563 A1 | 12/2003 | Wolmuth | |
| 2004/0024846 A1 | 2/2004 | Randall et al. | |
| 2004/0186778 A1 | 9/2004 | Margiloff | |
| 2005/0222989 A1 | 10/2005 | Haveliwala | |
| 2005/0228797 A1 | 10/2005 | Koningstein | |
| 2005/0246174 A1 | 11/2005 | DeGolia | |
| 2006/0004627 A1 | 1/2006 | Baluja | |
| 2006/0015401 A1 | 1/2006 | Chu | |
| 2006/0053048 A1 | 3/2006 | Tandetnik | |
| 2006/0095418 A1 | 5/2006 | Anderson | |
| 2006/0123014 A1 | 6/2006 | Ng | |
| 2006/0171520 A1 | 8/2006 | Kliger | |
| 2006/0173827 A1 | 8/2006 | Kliger | |
| 2006/0173915 A1 | 8/2006 | Kliger | |
| 2006/0229102 A1 | 10/2006 | Kitazoe et al. | |
| 2007/0016469 A1 | 1/2007 | Bae | |
| 2007/0127650 A1 | 6/2007 | Altberg | |
| 2007/0242811 A1 | 10/2007 | Wolmuth | |
| 2007/0248222 A1 | 10/2007 | Wolmuth | |
| 2007/0263799 A1 | 11/2007 | Wolmuth | |
| 2007/0274476 A1 | 11/2007 | Wolmuth | |
| 2008/0081599 A1 | 4/2008 | Wolmuth | |
| 2008/0081661 A1 | 4/2008 | Wolmuth | |
| 2008/0084988 A1 | 4/2008 | Wolmuth | |
| 2008/0091536 A1 | 4/2008 | Wolmuth | |
| 2008/0154856 A1 | 6/2008 | Riise | |
| 2008/0208675 A1 | 8/2008 | Wolmuth et al. | |
| 2008/0212765 A1 | 9/2008 | Wolmuth et al. | |
| 2009/0094235 A1 | 4/2009 | White et al. | |

FOREIGN PATENT DOCUMENTS

WO    WO 2006/037218    4/2006

OTHER PUBLICATIONS

"IBM Directory Assistance System Gateway Processor User Guide", © International Business Machines Corporation, Sep. 1987 (Day not given.), 34 pages.

"Wireless Application Protocol Forum, Product and Service Guide", WAP Forum Ltd., Mountain View, California, USA, May 1999 (Day not given.), 16 pages.

Oftel, "Telecommunications Act 1984 Provisional Order Under Section 16," Jun. 15, 1999, 6 pages.

Bryson, McDowell, et al., "The Concierge Key to Hospitality," John Wiley & Sons, Inc., 1992.

McKenzie, M., *Web Services Go Searching for Dollars: Will Consumers Accept Pay-to-Play Search Engines?*, Seybold Report on Internet Publishing, "Learning Experience: Houghton Mifflin Takes Textbook Business Online," Seybold Publications, 1998, 28 pages.

CNET News, "Engine Sells Results, Draws Fire," CNETNews.com, Jun. 21, 1996, 2 pages.

Live Deal Inc, "Form 10QSB (Quarterly Report of Financial condition)," Edgar Online, Inc., 2007, 7 pages.

PR Newswire, "Nuance and Unisys Help VMS Deliver 'Talking' Yellow Pages; Call FYI Offers Convenience with Voice-Driven Directory; VMS Plans to Deploy voice Service Nationwide in 2000," PR Newswire Association, Inc., Dec. 14, 1992, 2 pages.

Marek, S., "Directory Assistance Delivers the Numbers," Cellular/PCS; p. 20, *Wireless Week*, Nov. 18, 2002.

"GTE Offers Auto Directory-Connect Service", *TelecomWorldWire*, May 20, 1994.

Colby, R., "Hello Pages Provide Data by Telephone", *The Sunday Oregonian*, Portland, Oregon, Nov. 12, 1989.

Kosseff, J., "The Magic of Metro One", *TechNW*, Jul. 30, 2001.

"Advanced 411 Service", Cellular/PCS; p. 24; *Wireless Week*, Aug. 20, 2001.

Mendez-Wilson, D., "Starting a Mobile DA Evolution Deregulation Could Increase Competition in Growing Market", Section: Cellular/PCS; p. 24; *Wireless Week*, Apr. 15, 2002.

"Cellcom Chooses Infonxx Solution for Directory Assistance", p. 49, RCR Wireless News, Oct. 29, 2001.

Mendez-Wilson, D., "Fueling a Surge in Directory Assistance Services Expected to Drive Wireless Subscriber Growth, Reduce Churn", Section Cellular/PCS; p. 20, *Wireless Week*, Jan. 21, 2002.

"Bits" Section Departments; Service Providers, p. 10; *Wireless Week*, Aug. 1, 2003.

Meyer, D. et al. "Directory Provider Bruised by Sprint PCS, Cingular Disconnects", p. 14, *RCR Wireless News*, Oct. 28, 2002.

Bourrie, S.R., "Taking Directory Assistance to the Next Level" Section Business/Finance, p. 27; *Wireless Week*, Jun. 19, 2000.

"Briefs", Section Business/Finance, p. 18; *Wireless Week*, Jan. 14, 2002.

"Bits", Section Departments/Service Providers; p. 10; *Wireless Week*, Feb. 1, 2003.

"Bits", Section Departments/Service Providers; p. 12; *Wireless Week*, Feb. 15, 2003.
International Search Report and Written Opinion issued in PCT/US05/43251 on Jul. 5, 2006.
U.S. Appl. No. 10/063,990 electronically captured on Oct. 11, 2011.
U.S. Appl. No. 11/728,187 electronically captured on Oct. 11, 2011.
U.S. Appl. No. 11/728,261 electronically captured on Oct. 11, 2011.
U.S. Appl. No. 11/728,188 electronically captured on Oct. 11, 2011.
U.S. Appl. No. 11/897,264 electronically captured on Oct. 11, 2011.
U.S. Appl. No. 11/897,262 electronically captured on Oct. 11, 2001.
U.S. Appl. No. 11/897,249 electronically captured on Oct. 11, 2011.
U.S. Appl. No. 11/897,263 electronically captured on Oct. 11, 2011.
U.S. Appl. No. 11/981,520 electronically captured on Oct. 11, 2011.
U.S. Appl. No. 11/981,684 electronically captured on Oct. 11, 2011.
U.S. Appl. No. 12/284,722 electronically captured on Oct. 11, 2011.
U.S. Appl. No. 11/289,766 electronically captured on Oct. 11, 2011.
U.S. Appl. No. 11/290,148 electronically captured on Oct. 11, 2011.
U.S. Appl. No. 11/291,094 electronically captured on Oct. 11, 2011.
International Search Report issued in PCT/US08/11067 on Dec. 1, 2008.
International Preliminary Report on Patentability in PCT/US08/11067 on Mar. 24, 2010.
U.S. Appl. No. 11/897,262 between Oct. 13, 2011 and Jan. 13, 2012 electronically captured on Jan. 13, 2012.
U.S. Appl. No. 11/897,249 between Oct. 13, 2011 and Jan. 13, 2012 electronically captured on Jan. 13, 2012.
U.S. Appl. No. 11/290,148 between Oct. 13, 2011 and Jan. 13, 2012 electronically captured on Jan. 13, 2012.
U.S. Appl. No. 11/291,094 between Oct. 13, 2011 and Jan. 13, 2012 electronically captured on Jan. 13, 2012.

* cited by examiner

SIC Division Structure

A. Division A: *Agriculture, Forestry, and Fishing*
   - Major Group 01: *Agriculture Production Crops*
   - Major Group 02: *Agricultural Production Livestock And Animal Specialties*
   - Major Group 07: *Agricultural Services*
   - Major Group 08: *Forestry*
   - Major Group 09: *Fishing, Hunting, and Trapping*

B. Division B: *Mining*
   - Major Group 10: *Metal Mining*
   - Major Group 12: *Coal Mining*
   - Major Group 13: *Oil And Gas Extraction*
   - Major Group 14: *Mining And Quarrying Of Nonmetallic Minerals, Except Fuels*

C. Division C: *Construction*
   - Major Group 15: *Building Construction General Contractors And Operative Builders*

FIG. 3

SIC Major Group 58

Major Group 58: *Eating And Drinking Places*

<u>Major Group Structure</u>

This major group includes retail establishments selling prepared foods and drinks for consumption on the premises; and also lunch counters and refreshment stands selling prepared foods and drinks for immediate consumption. Restaurants, lunch counters, and drinking places operated as a subordinate service facility by other establishments are not included in this industry, unless they are operated as leased departments by outside operators. Thus, restaurants and lunch counters operated by hotels are classified in Services, Major Group 70; those operated by department stores in Major Group 53. Bars and restaurants owned and operated for members of civic, social, and fraternal associations only are classified in Industry 8641. Mobile food and dairy wagons are classified in Industry 5963.

- Industry Group 581: *Eating And Drinking Places*
  o <u>5812 *Eating Places*</u>
  o <u>5813 *Drinking Places (Alcoholic Beverages)*</u>

FIG. 4

TOLL-FREE DIRECTORY ASSISTANCE WITH AUTOMATIC SELECTION OF AN ADVERTISEMENT FROM A CATEGORY

RELATED APPLICATION(S)

This application is a continuation of U.S. application Ser. No. 10/063,990, filed May 31, 2002 now U.S. Pat. No. 7,212,615. The entire teachings of the above application(s) are incorporated herein by reference.

BACKGROUND OF THE INVENTION

1. Field of the Invention

This invention relates to systems for providing telephone toll services such as, but not limited to, directory assistance or long-distance calling.

2. Description of Prior Art

The need for phone customers to locate the name, address and number of businesses such as airlines, floral shops and auto repair shops has been around for almost as long as the phone has been in existence.

Currently most phone systems charge extra for the look up of the names and addresses and numbers of general or specific businesses. This can get to be costly and many telephone customers find such directory assistance charges to be excessive.

There is also a current need for many businesses to market to a wide pool of consumers with targeted advertisement. This can be done efficiently through the use of SIC codes or "Standard Industry Codes." By knowing exactly what a particular consumer is looking for at that particular moment a company can target their scope of interest with an ad.

The use of advertisements within a telephone system is well known in the art. U.S. Pat. No. 4,850,007 by Marino is for a "Telephone toll service with advertising". It is a system for providing an economical telephone toll service in which a telephone subscriber selects the economical service by, for example, sending an appropriate signal, and then dials his directory assistance call or other telephone toll call. After the caller's options are determined, and typically before signaling for the call is commenced, a recorded-announcement of an aural or visual nature is connected to the subscriber's line, with the announcement consisting of at least one advertisement. The advertisements are selected from a databank according to some predetermined technique of selection, which may include any number of factors or features to make the service attractive to subscribers and of a nature to make the service also sufficiently rewarding to advertisers. The advertisement is not however, tied to the caller's specific interests or SIC code based on the number dialed.

U.S. Pat. No. 5,448,625 by Lederman is a "Telephone advertising method and apparatus." It is a method and apparatus for routing a telephone call through a telephone network from a caller to a called party designated by the caller via advertising service apparatus that operates in two modes successively, the parties being in communication with each other in one mode and ads are selected from storage during that mode and the ads are impressed on one or both of the parties during a different mode. Selection of ad messages for use is controlled by many criteria. Delivery of the advertisements is recorded for accounting purposes. The modes may alternate between message intervals whose duration is determined by ad message length and communication intervals whose length is determined by a talking time timer. Still there is a need for better selection criteria.

U.S. Pat. No. 5,852,775 by Hidary is a "Cellular telephone advertising system." It discloses a cellular telephone system, which is provided with an ad server and a memory for holding various commercial messages. The messages are either generic or are tailored for specific demographically selected subscribers or geographic cells. When communication is established either between a subscriber or a nonsubscriber, at least one of them receives either a generic or a specific commercial message. These advertisements are not geared to the needs of a particular caller.

U.S. Pat. No. 5,652,784 by Blen is an "Automatic telephone advertising provided in lieu of dial-tone." This invention discloses a telephone advertising service providing a short advertising message through a telephone receiver as a telephone call is initiated. Several different messages are offered in different sets of channels, with the messages changing depending on the time of day. When a prohibit service signal is active, the subscriber line is switched directly to the telephone exchange. These messages are not targeted towards the interests of a particular caller.

There is still room for improvement within the art.

SUMMARY OF THE INVENTION

It is a general object of the present invention to have a process that allows the cross marketing of phone customers when they ask for directory assistance.

The current invention is such that if a consumer is interested in airline tickets and they are calling Directory Assistance an ad based on their interest is played to that consumer. An airline or travel related ad will have a much higher impact and be received with a much higher level of interest with this consumer than to someone who is watching the evening news and is shown an airline ad.

By knowing exactly what a particular consumer is looking for at the moment they are looking; you can target their scope of interest with an ad. Using SIC code or "Standard Industry Code" or even some other variable such as having a live operator select which ad would be appropriate does this.

The concept is to use the information obtained in the 10 second listing request to play a targeted message and offer instant access to the product or service related to that message via "live call transfer" or "press 1 to be transferred to (the advertiser) now".

For non-SIC code ads general, non-category specific ads such as "refinancing your home" or a home improvement ad can be played. These ads can be played based on the point of call. This can be done by setting up calls to be routed to a specific ad if the point of the caller's location is within a specific area code, zip code, city block or other parameter.

This would be helpful for companies like Home Depot, who might want to buy ad space in zip codes of "mostly owner occupied residences", or pay day advance stores, who might want to buy advertisement for areas which are more economically depressed.

The type of ad and when the ad is played, can be controlled to a highly specific degree.

This system involves Point of call routing which is the routing an inbound 800 number call based on the location of the caller and routing the call to any predetermined location using zip code, area code, area code and prefix or city block maps.

Ads can be bought to target specific competitor names or industry codes. They can also be bought by markets delineated by zip code, area code city block or statewide.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIG. 3 gives an example of Division Structure of SIC codes;

FIG. 4 gives an example of a Major Group of the SIC codes;

DETAILED DESCRIPTION OF THE INVENTION

A description of example embodiments of the invention follows.

Preferred Embodiment

The preferred embodiment of the invention is a process that allows the cross marketing of phone customers asking for directory assistance.

Figure 1:
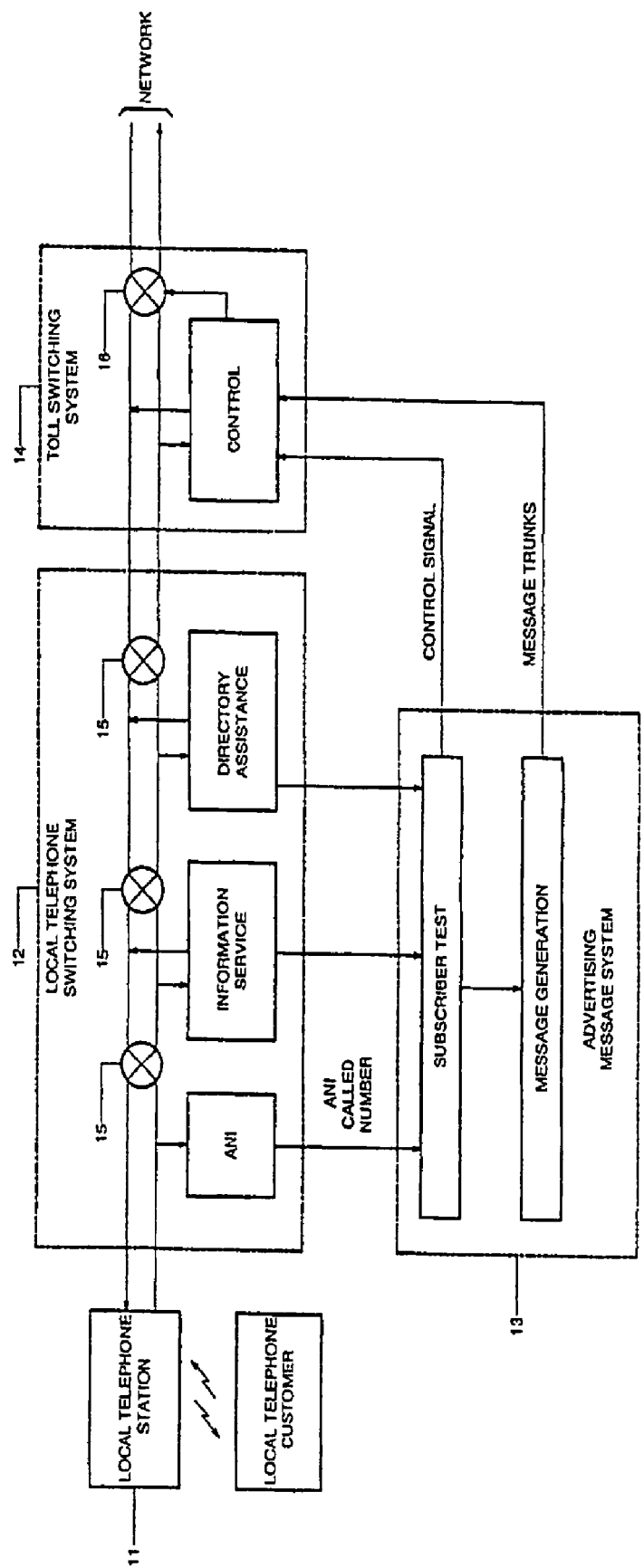
FIG. 1 is a block diagram of a telephone toll system embodying the present invention.

In FIG. 1, the local telephone station 11 is the typical telephone handset, in the usual case, and is connected by the typical local loop wires and connections to a local telephone switching system 12 which in turn connects through a toll switching system 14 to the total telephone network. Interconnected with the local telephone switching system 12 and the toll switching system 14 is the advertising message system 13 which is adapted to provide the directory assistance which has been generally summarized above.

In general, the local telephone station 11 is used by a local telephone customer, the User 10, indicated schematically.

The internal connections of the system are, in more detail, the following. The line from local telephone station 11 will be routed, through portions of switching elements 15, to the directory assistant module of the local switching system 12 if that is the nature of the customer's request, and in general, this may have been reached by dialing a specific phone number such as 1-800-Dealers.

It is anticipated that the broadest volume of use will result from long distance calling. The preferred embodiment will use a routing automatic number identification (ANI) within local telephone switching system 12, together with the subscriber test equipment in advertising message system 13, will identify the local customer in question as being one who wants to receive reduced directory assistance or long distance calling so that his incoming line will automatically be connected to advertising message system 13 before his toll call is completed.

In all of the foregoing situations identified in local telephone switching system 12, the result will be that a signal is sent to advertising message system 13 which results in a control signal being sent to toll switching system 12 to switching elements 16 to prevent the further progress of the user's call until the new features of this toll service have been provided. Therefore, at this point, the local telephone subscriber is not in contact with the larger telephone network.

In point of fact, this message may be of either an aural or visual nature, especially if the local subscriber has made available a monitor or television set connected to his telephone line. When this message ends, the control network within toll switching system 14 then removes the block on the signaling for the toll call and the call goes out over the network in the usual fashion.

The current invention is as follows if a consumer is interested in airline tickets RIGHT NOW and they are calling Directory Assistance the correct ad played to that consumer, an airline or travel related ad, will have a much higher impact and be received with a much higher level of interest than to someone who is watching the evening news and is shown an airline ad.

By knowing exactly what a particular consumer is looking for at the moment they are looking you can target their scope of interest with an ad. Using SIC code or "Standard Industry Code" or even some other variable such as having a live operator select which ad would be appropriate does this.

The concept is to use the information obtained in the 10 second listing request to play a targeted message and offer instant access to the product or service related to that message via "live call transfer" or "press 1 to be transferred to (the advertiser) now".

For non SIC code ads general, non-category specific ads such as "refinancing your home" or a home improvement ad can be played. These ads can be played based on the point of call. This can be done by setting up calls to be routed to a specific advertisement if the point of the callers location is within a specific area code, zip code, city block or other parameter.

This would be helpful for companies like Home Depot, who might want to buy ad space in zip codes of "mostly owner occupied residences" or pay day advance stores which may want to purchase advertisement for areas that are more economically depressed.

The type of ad and when the ad is played can be controlled to a highly specific degree.

In the preferred embodiment the system will use Point of call routing, which is the routing of an inbound 800 number call based on the location of the caller and connecting that caller to any predetermined location using zip code, area code, area code and prefix or city block maps.

Ads can be bought to target specific competitor names or industry codes. They can also be bought by markets delineated by zip code, area code city block or statewide.

The advertisements could also have been chosen on a random basis, or they could have been chosen to provide sufficient exposure to each of the advertisers who provided the ads for this service. In any event these advertisements will be stored in a large-scale mass memory or memory means.

In all of the foregoing versions of the service, it should be apparent that the interactive logic could be extended to make it possible for the customer to indicate, e.g., by dialing appropriate digits, that he wishes written material to be sent to him or that he wishes to talk to a salesman—now or later.

Figure 2:
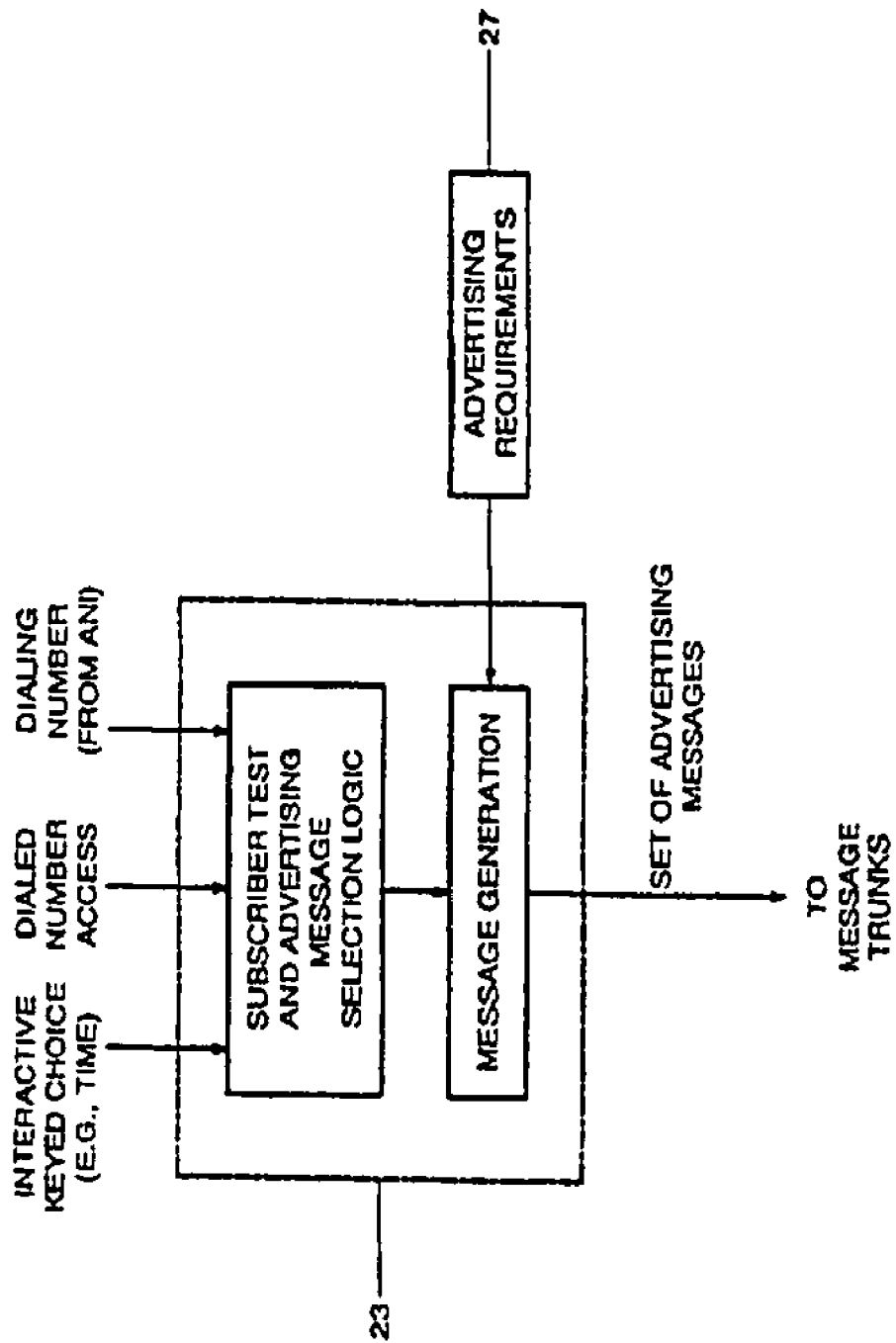
FIG. 2 shows a block diagram of parts of the system involved with selecting the type of announcement connected to a particular subscriber's line.

We have attempted to lay out in FIG. 2 a chart illustrating most of the foregoing message choice criteria in a logical manner.

We have disclosed a sample of the SIC Division Structure in FIG. 3 and the SIC Major Group 58 in FIG. 4 to display the industry standard codes that can be used in the selection process.

Figure 5:
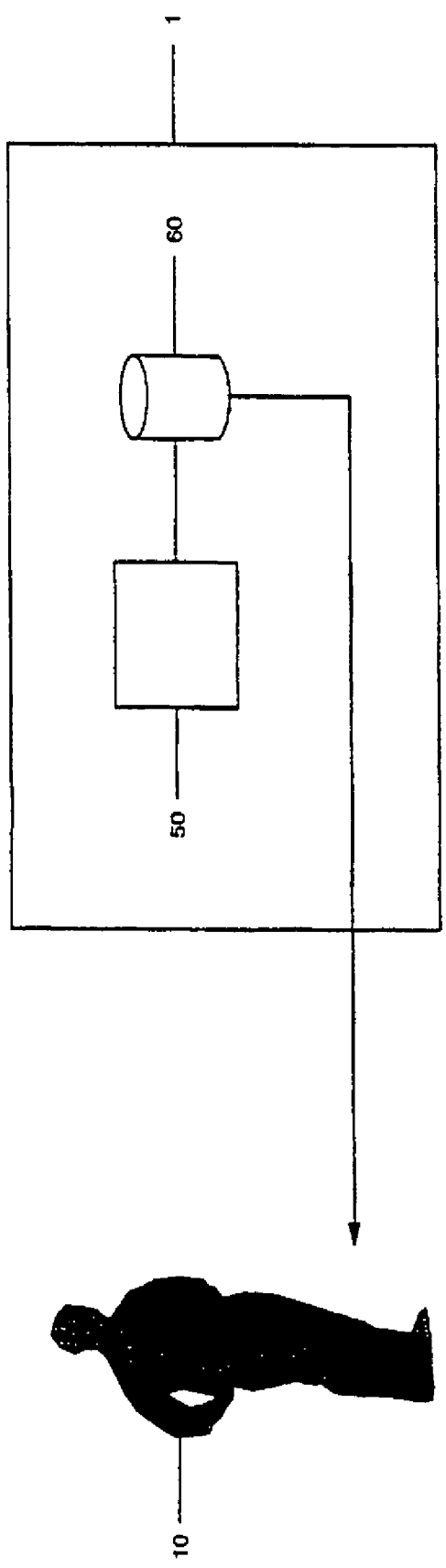
FIG. 5 is a schematic of the system.

FIG. 5 is a schematic of how system 1 works. The User 10 calls and is connected to a directory assistance number. The User 10 requests a number or a type of service or good, the system uses this as part of the selection criteria which is used by a selection means 50 such as a computer processor and selects an advertisement from the database 60 and the advertisement is played back to the User 10.

Figure 6:
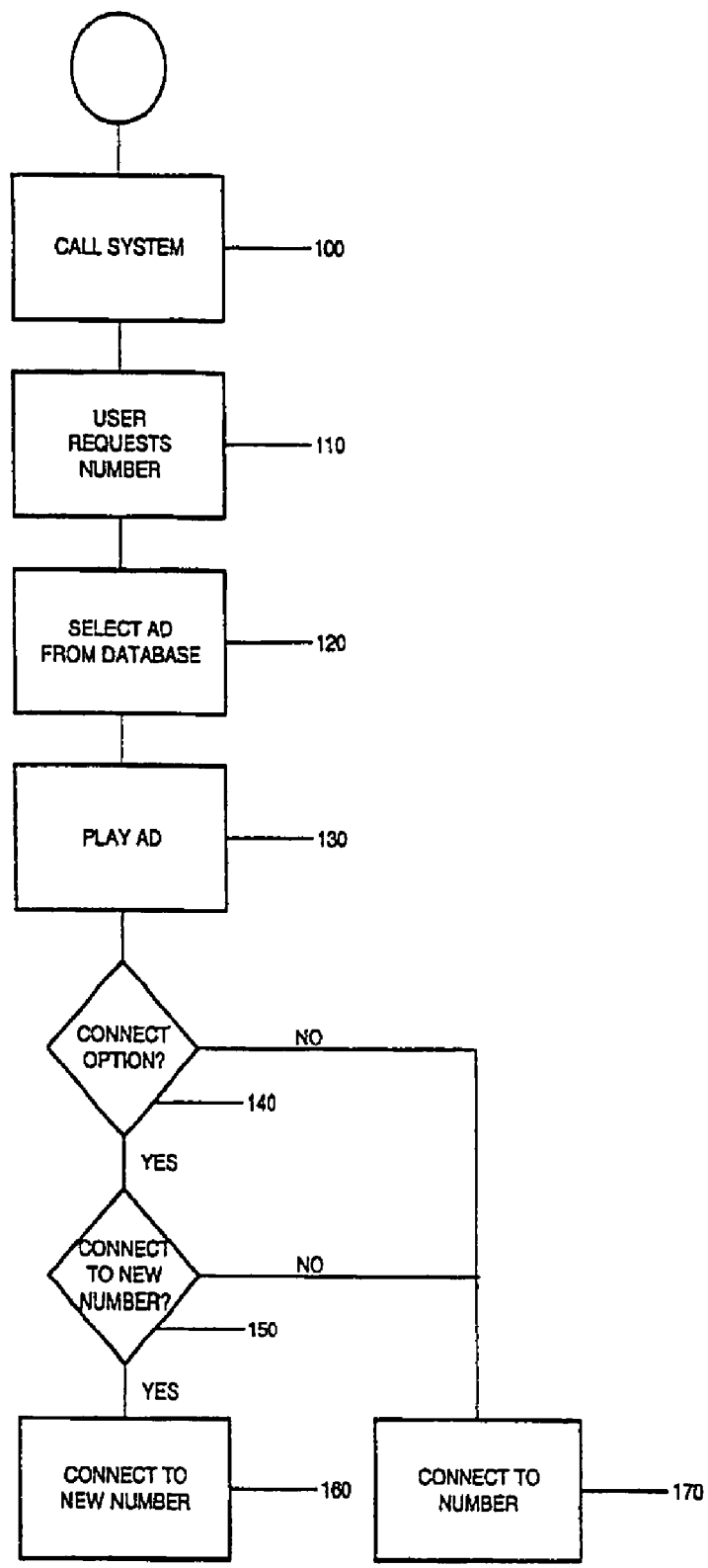
FIG. 6 gives a flowchart of the system.

FIG. 6 is a basic flowchart of the process. In Step 100, the User 10 calls the system 1. The User 10 then requests a specific number of a company or a type of goods or services in Step 110. The system 1 uses the request, along with additional information such as the locations from where call was placed and other targeting information to select an ad from the advertising database 60 in step 120. The system 1 retrieves the ad and plays it for the User 10 in step 130. In step 140, the system 1 asks "is there a connection option for this ad?" If yes, the User 10 is asked if they want to opt to be connected to the advertiser's number 150. If yes, the User 10 is connected to the advertiser's number 160. If no, the User 10 is connected to their selected number 170. If there is no connection option for this ad, the User 10 is connected to their selected number 170.

Additional Embodiment

This system could also be used in a wireless environment with Handheld PCs or an Internet or chat environment.

Advantages

The current invention provides much needed inexpensive directory assistance. The user calls a unique number for directory assistance, an operator answers that call and asks the user of his/her desired phone number, the system then uses this phone number as one of the basis for the selection criteria to select an advertisement for the system to play for the user. After the user listens to the advertisement, the system will provide the user with the desired phone number. The system may have the option for the user to select on or contact another company for the service.

The teachings of all patents, published applications and references cited herein are incorporated by reference in their entirety.

While this invention has been particularly shown and described with references to example embodiments thereof, it will be understood by those skilled in the art that various changes in form and details may be made therein without departing from the scope of the invention encompassed by the appended claims.

What is claimed is:

1. A method for providing directory assistance information in a public telecommunication network accessed by a directory assistance number, the method comprising:
    at a call processing station;
    setting up a call between the call processing station and a customer station who dialed the directory assistance number to access the call processing station;
    receiving a request for directory assistance information from the customer station relating to a telephone number for a specific provider of goods or services;
    examining the request for directory assistance information to select a telephone number of the specific provider of goods or services to provide to the customer station;
    automatically selecting an advertisement categorized within a category associated with the specific provider of goods or services based on the selected telephone number; and
    forwarding the selected advertisement from a database to the customer station.

2. The method of claim 1, further comprising:
    asking a user to be connected to an advertised provider associated with said automatically selected advertisement; and
    connecting to said advertised provider if said user agrees to be connected to the advertised provider.

3. The method of claim 1, wherein the directory assistance information is provided toll free.

4. The method of claim 3, wherein the directory assistance information is associated with a toll free telephone number.

5. The method of claim 1, wherein the advertisement is selected for competing goods and services.

6. The method of claim 1, wherein a selection criteria for the advertisement is based on the user's geographical location.

7. The method of claim 1, wherein a selection criteria for the advertisement is based on a user's telephone number.

8. The method of claim 1, wherein the advertisements are stored in a memory.

9. The method of claim 1, wherein the advertisement is selected based on a Standard Industry Code associated with the specific provider of goods or services.

10. A computer having a stored computer program and processor to execute computer program instructions that cause the computer to:
    set up a call between a call processing station and a customer station who dialed a directory assistance number to access the call processing station;
    receive, over a public telecommunication network, a directory assistance request for information from the customer station relating to a telephone number for a specific provider of goods or services;
    examine the request for information to select a telephone number of the specific provider of goods or services to provide to the customer station;
    select an advertisement categorized within a category associated with the specific provider of goods or services, automatically, based on the selected telephone number; and
    forward the selected advertisement to the customer station.

11. The computer of claim 10, wherein the advertisement is selected for competing goods and services.

12. The computer of claim 10, further containing instructions that, when executed, cause the computer to:
    select an advertisement based on at least one of geographic location for the customer station and a telephone number for the customer station.

13. The computer of claim 10, further containing instructions that, when executed, cause the computer to:
    provide access to a service associated with the selected advertisement.

14. The computer of claim 10, further containing instructions that, when executed, cause the computer to:
    connect the customer station to a telephone number associated with the selected advertisement.

15. The computer of claim 14, wherein the connect is performed only after an optional prompt of a user of the customer station.

16. The computer of claim 14, wherein the connect is provided without cost to a user of the customer station.

17. The computer of claim 10, wherein the advertisement is selected based on a Standard Industry Code associated with the specific provider of goods or services.

18. A system for providing access to directory assistance information in a public telecommunication network accessed by a directory assistance number, the system comprising:
    a customer station including call connection circuitry; and
    a call processing station that operates to set up a call between the call processing station and the customer station who dialed the directory assistance number to access the call processing station, to receive a request for directory assistance information from the customer station relating to a telephone number for a specific provider of goods or services, to examine the request for directory assistance information to select a telephone number of the specific provider of goods or services to provide to the customer station, to automatically select an advertisement categorized within a category associated with the specific provider of goods or services based on the selected telephone number, and to selectively forward the selected advertisement to the customer station.

19. The system of claim 18, wherein the advertisement is selected for competing goods and services.

20. The system of claim 18, the customer station further comprising:
   an input device to obtain the directory assistance number used for accessing the call processing station;
   a transmitter that operates to transmit the request for directory assistance information; and
   a first receiver that operates to receive the selected advertisement.

21. The system of claim 20, the call processing station further comprising:
   a second receiver that operates to receive the request for directory assistance information from the customer station; and
   a processor that operates to retrieve the selected advertisement from a stored media.

22. The system of claim 18, further comprising:
   a database apparatus that operates to process a query to determine the selected advertisement, the query having at least one query parameter derived from the request for directory assistance information.

23. The system of claim 18, the customer station further comprising:
   an audio output device that operates to play the advertisement in an audible form.

24. The system of claim 18, the customer station further comprising:
   a visual output device that operates to display the advertisement.

25. The system of claim 18, wherein the call processing station further selects the advertisement based on a telephone number requested by a user.

26. The system of claim 18, wherein the call processing station further provides access to a service associated with the selected advertisement.

27. The system of claim 26, wherein the customer station is selectively connected to a telephone number associated with the selected advertisement.

28. The system of claim 26, wherein the customer station is connected to the service provider associated with the selected advertisement only after prompting a user.

29. The system of claim 18, wherein the call processing station further determines the selected advertisement by using the associated category identified from the request for directory assistance information as at least one database query parameter.

30. The system of claim 29, wherein the call processing station further operates to query a database to return an optional intercept parameter associated with the selected advertisement, and the optional intercept parameter is used by the call processing station to determine whether a user of the customer station is to be prompted to request access to a service associated with the selected advertisement.

31. The system of claim 18, the call processing station further operates to determine the selected advertisement by using the associated category determined from the request for directory assistance information and a location associated with the customer station as database query parameters.

32. The system of claim 18, wherein the customer station is selectively connected to a telephone number for the specific provider associated with the request for information.

33. The system of claim 32, wherein the connection is provided at reduced cost as compared to a standard cost for a request for directory assistance information associated with a telecommunication service provider.

34. The system of claim 32, wherein the connection is provided without cost to a user of the customer station.

35. An apparatus for providing directory assistance information in a public telecommunication network accessed by a directory assistance number comprising:
   an advertisement database to store a plurality of advertisements categorized within a plurality of categories;
   a selector to automatically select an advertisement, categorized within a category associated with a specific provider of goods or services, from the plurality of advertisements in the advertisement database based on a telephone number of the specific provider of goods or services, the telephone number determined by examining a directory assistance request received over the public telecommunication network for a customer station who dialed the directory assistance number; and
   an output device to forward the selected advertisement to an external device.

36. The apparatus of claim 35, wherein the selector is configured to target the advertisement to competing goods and the services.

37. The apparatus of claim 35, wherein the output device is further configured to format the selected advertisement to be played or displayed on the external device, wherein the external device is one of a telephone, a cellular telephone, an Internet telephone and a handheld computer device.

38. The apparatus of claim 35, wherein the selector is configured to select the advertisement based on a Standard Industry Code associated with the specific provider of goods or services.

39. A method for providing directory assistance information in a public telecommunication network accessed by a toll-free number, the method comprising:
   at a call processing station:
   setting up a call between the call processing station and a customer station who dialed the toll-free number to access the call processing station;
   receiving a request for information from the customer station relating to a telephone number for a specific provider of goods or services;
   examining the request for information to select a telephone number of the specific provider of goods or services;
   automatically selecting an advertisement categorized within a category associated with the specific provider of goods or services based on the selected telephone number; and
   forwarding the selected advertisement from a stored media to the customer station.

40. The method of claim 39, further comprising:
   querying a database to determine the selected advertisement, the querying using at least one query parameter from the examining the request for information.

41. The method of claim 40, wherein the query parameter is a geographic location component of the specific provider of goods or services in the request for information.

42. The method of claim 40, wherein the query parameter is a name of a business that is the specific provider of goods or services.

43. The method of claim 40, wherein the query parameter is a general type of business associated with the specific provider of goods or services specified in the request for information.

44. The method of claim 40, wherein the query parameter is a description of a product or service.

45. The method of claim 40, wherein the query parameter is a code associated with the specific provider of goods or services related to the request for information.

46. The method of claim 40, wherein the code is a Standard Industry Classification (SIC) code of the specific provider of the goods or services related to the request for information.

47. The method of claim 40, wherein the query parameter is the telephone number associated with the specific provider associated with the request for information.

48. The method of claim 47, wherein the query parameter is a SIC code associated with the telephone number associated with the specific provider.

49. The method of claim 39, further comprising:
causing the advertisement to be played to the customer station in an audible form.

50. The method of claim 39, further comprising:
causing the advertisement to be played to the customer station in a visual form.

51. The method of claim 39, wherein the automatically selecting the advertisement further comprises:
automatically selecting the advertisement based on an additional criteria including at least one of geographic location for the customer station or a telephone number for the customer station.

52. The method of claim 39, further comprising:
providing access to a service associated with the selected advertisement.

53. The method of claim 52, further comprising:
connecting the customer station to a telephone number associated with the selected advertisement.

54. The method of claim 53 wherein the connecting is performed only after optionally prompting the user of the customer station.

55. The method of claim 54, wherein the connecting to a telephone number associated with the selected advertisement is provided at reduced cost as compared to a standard cost for a request for directory information associated with a telecommunication service provider.

56. The method of claim 54, wherein the connecting to a telephone number associated with the selected advertisement is provided without cost to the user of the customer station.

57. The method of claim 39, further comprising:
querying a database to determine the selected advertisement, the querying using the associated category identified from the request as at least one database query parameter.

58. The method of claim 57, wherein the database query furthermore returns an optional intercept parameter associated with the selected advertisement, wherein the optional intercept parameter is used to determine whether the user of the customer station is to be prompted to request access to a service associated with the advertisement.

59. The method of claim 39, further comprising:
querying a database to determine the selected advertisement, the querying using the associated category determined from the request and a location associated with the customer station as database query parameters.

60. The method of claim 39, further comprising:
connecting the customer station to a telephone number for the specific provider associated with the request for information.

61. The method as in claim 39 wherein the request for information relating to a telephone number for a specific provider of goods or services does not inherently determine the category.

62. A call processing station for providing access to directory assistance information for a public network via a toll-free number, the call processing station comprising:
a receiver to receive a request for directory assistance information from a customer station relating to a telephone number for a specific provider of goods or services;
a processor to examine the request for directory assistance information to select a telephone number of the specific provider of goods or services and automatically select an advertisement categorized within a category associated with the specific provider of goods or services based on the selected telephone number; and
a transmitter to selectively forward the selected advertisement to the customer station.

63. The call processing station of claim 62, wherein the processor is further configured to query a database to determine the selected advertisement, the querying using at least one query parameter from the examining the request for information.

64. The call processing station of claim 62, wherein the processor operates to retrieve the selected advertisement from a stored media.

65. The call processing station of claim 62, further comprising:
a database apparatus that operates to process a query to determine the selected advertisement, the query having at least one query parameter derived from the request for directory assistance information.

66. The call processing station of claim 62, further comprising:
an audio output device that operates to cause the advertisement to be played to the customer station in an audible form.

67. The call processing station of claim 62, further comprising:
a visual output device that operates to cause the advertisement to be displayed to the customer station.

68. The call processing station of claim 62, wherein the processor further automatically selects the advertisement based on a telephone number requested by the user.

69. The call processing station of claim 62, wherein the call processing station further provides access to a service associated with the selected advertisement.

70. The call processing station of claim 69, wherein the call processing station selectively connects the customer station to a telephone number associated with the selected advertisement.

71. The call processing station of claim 70, wherein the call processing station selectively connects the customer station to the service provider associated with the selected advertisement only after prompting the user.

72. The call processing station of claim 62, wherein the database further determines the selected advertisement by using the associated category identified from the request for directory assistance information as at least one database query parameter.

73. The call processing station of claim 72, wherein the database query returns an optional intercept parameter associated with the selected advertisement, and the optional intercept parameter is used to determine whether the user of the customer station is to be prompted to request access to a service associated with the selected advertisement.

74. The call processing station of claim 62, wherein the database further determines the selected advertisement by using the associated category determined from the request for directory assistance information and a location associated with the customer station as database query parameters.

75. The call processing station of claim 62, wherein the call processing station selectively connects the customer station to a telephone number for the specific provider associated with the request for information.

* * * * *